United States Patent
Stewart et al.

(10) Patent No.: US 7,614,300 B2
(45) Date of Patent: *Nov. 10, 2009

(54) SYSTEM AND METHOD FOR MITIGATING ERRORS IN ELECTROSTATIC FORCE BALANCED INSTRUMENT

(75) Inventors: Robert E. Stewart, Woodland Hills, CA (US); Robert Griffith, Newhall, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 11/755,506

(22) Filed: May 30, 2007

(65) Prior Publication Data

US 2008/0295597 A1    Dec. 4, 2008

(51) Int. Cl.
*G01P 15/13* (2006.01)
*G01P 15/125* (2006.01)

(52) U.S. Cl. .................. 73/514.18; 73/514.32

(58) Field of Classification Search .............. 73/514.17, 73/514.18, 514.32, 514.36, 514.38, 1.37, 73/1.38, 862.61, 851.626
See application file for complete search history.

(56) References Cited

U.S. PATENT DOCUMENTS

| | | | |
|---|---|---|---|
| 4,679,434 A | 7/1987 | Stewart | |
| 5,142,921 A | 9/1992 | Stewart et al. | |
| 5,343,766 A * | 9/1994 | Lee | 73/862.61 |
| 5,440,939 A | 8/1995 | Barny et al. | |
| 5,473,946 A * | 12/1995 | Wyse et al. | 73/514.18 |
| 5,497,660 A | 3/1996 | Warren | |
| 5,503,285 A | 4/1996 | Warren | |
| 5,612,494 A * | 3/1997 | Shibano | 73/514.32 |
| 5,821,421 A * | 10/1998 | Le Reverend | 73/514.32 |
| 5,850,042 A | 12/1998 | Warren | |
| 6,105,427 A | 8/2000 | Stewart et al. | |
| 6,294,400 B1 | 9/2001 | Stewart et al. | |
| 6,360,602 B1 | 3/2002 | Tazartes et al. | |
| 7,334,474 B2 * | 2/2008 | Fax et al. | 73/514.18 |

* cited by examiner

*Primary Examiner*—Helen C. Kwok
(74) *Attorney, Agent, or Firm*—Tarolli, Sundheim, Covell & Tummino LLP

(57) ABSTRACT

System and method for mitigating errors in electrostatic force balanced instrument is provided. The system and method mitigate errors in measurement readings caused by charge buildup in force balanced instruments that employ charge pulses to generate an electrostatic force to null an inertial proof mass disposed between opposing electrodes. The system and method mitigate charge buildup by applying charge pulses to each opposing electrode of a sensing element for a given charge cycle time period in a normal polarity configuration followed by charge pulses to each opposing electrode of the sensing element for a second given charge cycle time period in a reverse polarity configuration.

19 Claims, 3 Drawing Sheets

US 7,614,300 B2

SYSTEM AND METHOD FOR MITIGATING ERRORS IN ELECTROSTATIC FORCE BALANCED INSTRUMENT

RELATED APPLICATIONS

The present application is related to U.S. patent application Ser. No. 11/031,271 filed on Jan. 7, 2005, entitled: "Force Balanced Instrument System and Method for Mitigating Errors" which is herein incorporated by reference.

TECHNICAL FIELD

The present invention relates to force balanced instruments and, more particularly, to a system and method for mitigating errors in electrostatic force balanced instrument.

BACKGROUND OF THE INVENTION

In a force balanced sensing instrument, such as an accelerometer for example, it is generally desired that the instrument output signal be proportional to the input condition to be sensed. Therefore, in many types of electrostatic and electromagnetic force balanced sensing instruments special techniques are required to obtain a linear relation between the instrument output and the sensed input. In electrostatic and electromagnetic instruments, the forces applied by the instrument forcer are not linearly related to the feedback voltage or current supplied to the forcer. Furthermore, for optimum operation of the instrument itself it is preferred that the feedback force applied by the feedback control network have a linear relation to the sensed input. Thus, special techniques have been employed for obtaining such linearity.

For example, in an electrostatic force balanced accelerometer, electrostatic forcing in a closed loop system is employed to position and obtain an output from a pendulous inertial mass or proof mass. The electrostatic forcing system employs a capacitative pickoff electrode on each side of a pendulous member that has been etched from a silicon substrate. A control pulse is employed to sequentially apply a constant amount of charge to each electrode. A variable force is applied to the inertial mass by varying the amount of time (e.g., duty cycle) the charge is left on a respective plate. The amount of time the charge is left on a respective plate is based on the displacement of the inertial mass relative to a null position.

However, the use of a constant charge applied to the plates is susceptible to charge buildup. This charge buildup leads to variations in the electrical characteristics of the accelerometer. These variations in electrical characteristics can result in measurements errors that vary across devices. The charge buildup is difficult to diagnose and model, since the charge buildup can be associated with inherent characteristics and/or manufacturing variations of a given device. Additionally, variations of temperature, aging and previous circuit conditions can affect the amount of charge buildup in the device.

SUMMARY OF THE INVENTION

In accordance with one aspect of the present invention, a force balanced instrument system is provided. The system comprises a sensing element having an inertial proof mass disposed between a first electrode plate and a second electrode plate, and a switching system switchable between providing charge pulses to the sensing element in a normal polarity configuration and providing charge pulses to the sensing element in a reverse polarity configuration. The system further comprises a control logic device that controls the switching of the switch system to provide charge pulses to the sensing element in the normal polarity configuration for a first charge cycle time period and to provide charge pulses to the sensing element in the reverse polarity configuration for a second charge cycle time period.

In accordance with another aspect of the present invention, a force balanced instrument is provided that includes a sensing element having an inertial proof mass disposed between a first electrode plate and a second electrode plate. The instrument comprises means for providing charge pulses, means for switching between applying charge pulses to a sensing element in a normal polarity configuration and applying charge pulses to a sensing element in a reverse polarity configuration, and means for controlling a charge cycle time period for applying charge pulses to the sensing element in a normal polarity configuration and controlling a charge cycle time period for applying charge pulses to the sensing element in a reverse polarity configuration.

In accordance with yet a further aspect of the present invention, a method is provided for mitigating error in a force balanced instrument that employs a sensing element having an inertial proof mass disposed between a first electrode plate and a second electrode plate. The method comprises switching the sensing element to one of a normal polarity configuration and a reverse polarity configuration, applying a charge pulse alternately to the first electrode plate and the second electrode plate for a first charge cycle time period, determining a first difference voltage between voltages induced by the charge pulses on the first electrode plate and the second electrode plate for each charge cycle sequence of the first charge cycle time period and aggregating the first difference voltage over time to set a duty cycle associated with the charge cycle sequence of the first charge cycle time period. The method further comprises switching to the other of the normal polarity configuration and the reverse polarity configuration, applying a charge pulse alternately to the first electrode plate and the second electrode plate for a second charge cycle time period, determining a second difference voltage between voltages induced by the charge pulses on the first electrode plate and the second electrode plate for each charge cycle sequence of the second charge cycle time period, and aggregating the second difference voltage over time to set a duty cycle associated with the charge cycle sequence of the second charge cycle time period.

DETAILED DESCRIPTION OF INVENTION

Figure 1:
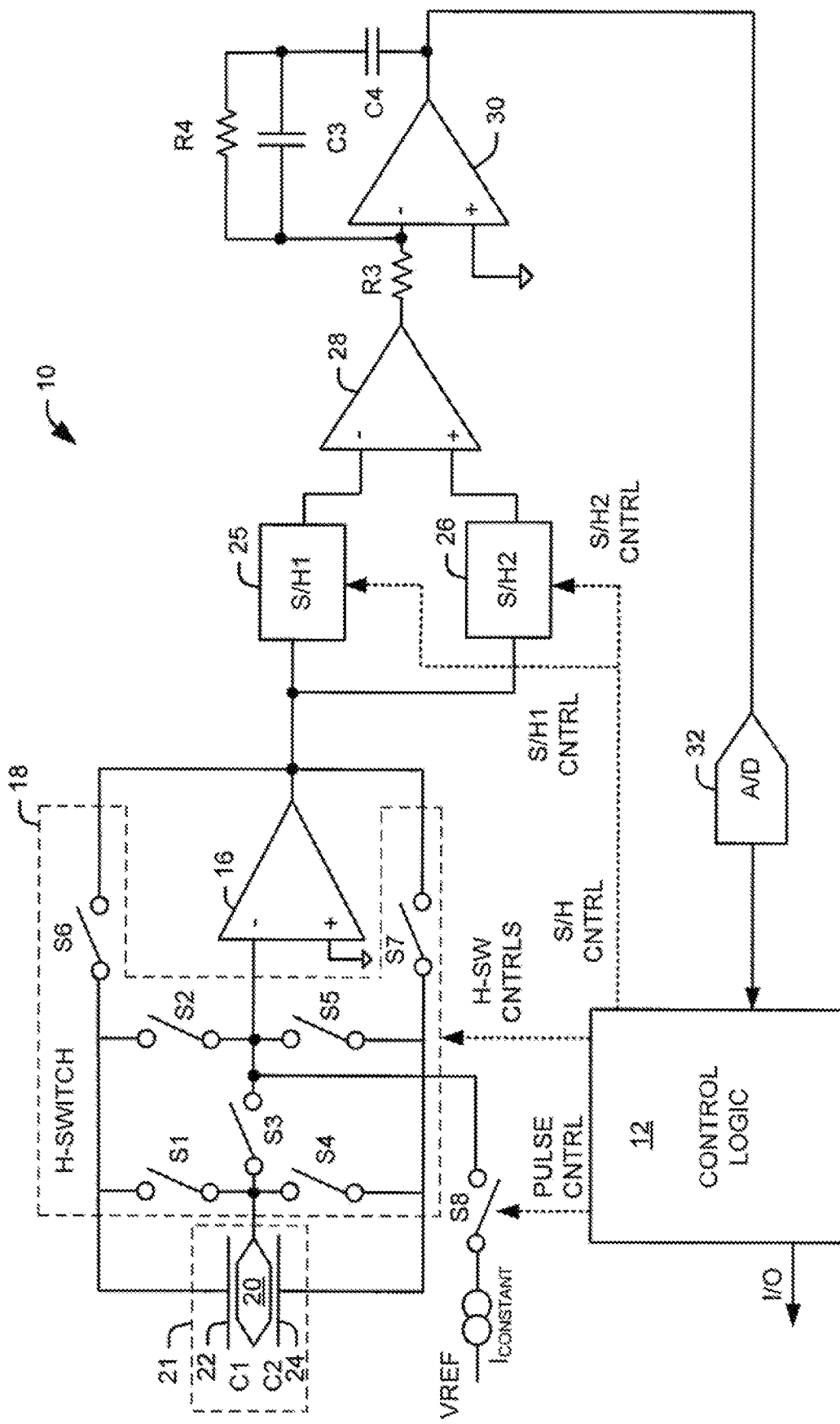
FIG. 1 illustrates a schematic diagram of an accelerometer system in accordance with an aspect of the present invention.

The present invention relates to a system and method for mitigating errors in electrostatic force balance instrument. The system and method mitigate errors in measurement readings caused by charge buildup in force balanced instruments that employ charge pulses to generate an electrostatic force to null an inertial proof mass disposed between opposing electrodes of a sensing element. The system and method mitigate charge buildup by applying charge pulses to each opposing electrode for a given charge cycle time period in a normal polarity configuration followed by charge pulses to each opposing electrode for a second given charge cycle time period in a reverse polarity configuration. In the normal polarity configuration, a given electrode of a sensing element receives a charge pulse and the proof mass is coupled to virtual ground. In the reverse polarity configuration, the proof mass and a given electrode of the sensing element are coupled together and receive a charge pulse with the opposing electrode being coupled to virtual ground resulting in a reversal of the polarity of the sensing element and the opposing electrode with respect to the proof mass. This results in the removal of any residual charge on the electrodes caused by the charge pulses in the normal polarity configuration. As a result the net residual charge left on the electrodes is reduced on the average.

In one aspect of the invention, a force balanced instrument system is provided. The system comprises a sensing element having an inertial proof mass disposed between a first electrode plate and a second electrode plate, and a switching system switchable between providing charge pulses to the sensing element in a normal polarity configuration and providing charge pulses to the sensing element in a reverse polarity configuration. The system further comprises a control logic device that controls the switching of the switch system to provide charge pulses to the sensing element in the normal polarity configuration for a first charge cycle time period and to provide charge pulses to the sensing element in the reverse polarity configuration for a second charge cycle time period.

In the present example, the term charge pulse is employed as term that provides a charge for a time duration to the electrodes of the force balanced instrument and is meant to define both a voltage pulse and a current pulse. For example, a charge pulse applied as a voltage pulse is provided as an input, which is converted to a current pulse when applied to the electrodes resulting in a charge being applied to the electrodes. Therefore, the term charge pulse is meant to indicate either of a current pulse or a voltage pulse.

It is to be appreciated that the electrostatic force (F) is a function of the charge squared ($Q^2$). Therefore, the polarity of the electrostatic force does not change with the polarity of the charge applied to the electrodes. The first and second charge cycle time periods can each be a single charge pulse sequence (i.e., single pulse to each opposing electrode) or a plurality of charge pulse sequences. Although the system and method will be illustrated with examples of an accelerometer system, it is to be appreciated that the system and method can be employed in a variety of different force balance instrument types.

A force balanced instrument, such as an accelerometer, employs a proof mass having combined electrostatic pickoff and forcing plates or electrodes on opposite sides thereof. The plates provide a constant attractive force in successive portions of a charge sequence acting alternately on opposing sides of the sensitive element. Force balance is achieved by controlling the duty cycle of the charge cycle sequence, so that the difference in duration between each of the portions of a full charge sequence is a linear measure of acceleration. Voltage on each of the forcing plates is sensed independently subsequently after each is charged with a charging pulse which provides a substantially fixed force level over the duration of the charge sequence portion. The two successive voltage samples are stored, and the difference between them integrated to control the duty cycle of the charge cycle sequence, which itself controls the duration of application of the alternately directed forces applied by the respective plates to the proof mass.

FIG. 1 illustrates a schematic block diagram of an exemplary accelerometer system 10 in accordance with an aspect of the present invention. Although the present example will be illustrated with respect to an accelerometer system, the present invention can be employed in a variety of other force balanced instrument system that employ charge pulses to null an inertial proof mass. The accelerometer system 10 provides one example of a technique for implementing sensing element electrode polarity reversal and charge pulse control, but it is to be appreciated that a variety of other techniques can be employed for implementing sensing element electrode polarity reversal and charge pulse control.

The accelerometer system 10 includes a sensing element 21 comprised of a proof mass or pendulous mass 20 disposed between a top electrode plate 22 and a bottom electrode plate 24. The proof mass 20 is positioned close to but slightly spaced from the top electrode plate 22 and bottom electrode plate 24, such that a first capacitor C1 is formed from the top electrode plate 22 and the proof mass 20 and a second capacitor C2 is formed from the bottom electrode plate 24 and the proof mass 20. The sensing element 21 can be formed from a semi-conductor substrate, such that the proof mass can be anisotropically etched from the semi-conductor substrate, so that the proof mass 20 is connected to the substrate in a cantilevered arrangement. The cantilever arrangement allows the proof mass 20 to deflect about an output axis in response to acceleration along an input axis. It is to be appreciated that one or more other elements associated with the accelerometer system 10 can be formed in the semi-conductor substrate, be stand-alone circuit devices, be integrated as an integrated circuit, or any combination of these.

The top electrode plate 22 and bottom electrode plate 24 form both pickoff and forcing plates such that a charge pulse is applied to a respective plate that causes an electrostatic force to be applied to the proof mass 20, while the voltage on the charge plate is sampled. The sampled voltage on the plate provides an indication of the displacement of the proof mass 20 relative to the sampled plate or opposing plate. A difference voltage between the sampled voltages on each respective electrode plate provides an indication of the displacement of the proof mass 10 relative to one plate over the other.

The accelerometer system 10 includes a single reference voltage (VREF) coupled to a charge amplifier 16 through a switch S8. A control logic device 12 generates a pulse control signal that controls the coupling of the reference voltage to provide charge pulses to the top and bottom electrode plates 22 and 24. The control logic device 12 can be a hardware device (e.g., an ASIC), a processor device that employs software instructions or a combination of hardware and software devices. It is to be appreciated that the control logic device 12 can be formed from a plurality of devices for providing the appropriate control, timing, and measurement functions associated with the control logic device 12. The pulse control signal couples the reference voltage to a negative input terminal of the charge amplifier 16 for a charge pulse time period causing a charge pulse to be applied to an input and thus provided at an output of the charge amplifier 16.

The control logic device 12 is operative to determine the number of charge cycle sequences or the charge cycle time period for applying charge pulses to the electrodes in normal polarity configuration and the number of charge cycle sequences or the charge cycle time period for applying charge pulses to the electrodes in the reverse polarity configuration. The normal polarity configuration charge cycle time period can be the same or different than the reverse polarity configuration charge cycle time period. For example, a pulse can be applied for a single charge cycle sequence in the normal polarity configuration followed by a pulse for a single charge cycle sequence in the reverse polarity configuration. Alternatively, a charge cycle time period can include many charge cycle sequences, such that pulses of a given polarity configuration are applied for a charge cycle time period that is over a range in the milliseconds, seconds, minutes or hours. The alternating between charge pulses in the normal polarity configuration and reverse polarity configuration for charge cycle time periods can be continuous during operation of the accelerometer system 10. By alternating between polarity configurations of the sensing element 21 for different charge cycle time periods, residual charge that builds up on the plates due to charge pulses in normal polarity configuration are discharged during charge pulses in reverse polarity configuration. Thus, errors in measurement readings are mitigated.

The control logic device 12 generates switch control signals (H-SW CNTRLS) coupled to an H-switch 18. The H-switch 18 is operative to couple the output of the charge amplifier 16 to one or the other of the top electrode plate 22 and the bottom electrode plate 24, while coupling the non-selected electrode plate to virtual ground in normal polarity configuration. The H-switch 18 is operative to couple the output of the charge amplifier 16 to the proof mass 20 and one or the other of the top electrode plate 22 and the bottom electrode plate 24, while coupling the selected electrode plate to virtual ground (i.e., negative input terminal of the charge amplifier 16) in reverse polarity configuration. It is to be appreciated that a variety of different switching devices could be employed to provide the functionality of the H-switch 18. The H-switch 18 includes switches S1-S7, which are controlled by the switch control signals that directs charge pulses between opposing electrodes in both the normal and reverse polarity configurations.

In normal polarity configuration, the charge pulse will cause the voltage on the selected electrode plate to ramp up to a plate voltage that provides an indication of the displacement of the proof mass 20 relative to the selected plate. In the reverse polarity configuration the selected electrode plate will remain at virtual ground, while the non-selected plate and the proof mass will ramp up to a plate voltage that provides an indication of the displacement of the proof mass 20 relative to the selected plate. However, since the voltage difference between the proof mass 20 relative to the selected plate is negative, the residual charge on the electrodes due to charge pulses in the normal polarity configuration is removed, such that the net residual charge is reduced on the average. The control logic device 12 is operative to discharge the plate voltage from the selected electrode plate by generating a reset signal coupling the electrode to ground via another switch (not shown) or by coupling the electrode plate to virtual ground by closing an appropriate switch of the H-switch 18.

During a charge cycle sequence in the normal polarity configuration, the control logic device 12 closes switch S3 coupling the proof mass 20 to virtual ground and switch S6 coupling the output of the charge amplifier 16 to the top electrode plate 22, while allowing the remaining switches S1, S2, S4, S5 and S7 to remain open. The control logic device may also close another switch (not shown) that couples the bottom electrode plate 24 to ground or close switch S4 or S5 to couple the bottom electrode plate 24 to virtual ground. A charge pulse is applied by the pulse control signal that closes and opens switch S8 coupling the reference voltage VREF to the input of the charge amplifier 16 and providing a charge pulse at the output of the charge amplifier 16 and to the top electrode plate 22. The top electrode plate voltage ramps up to a positive voltage relative to ground that relates to the displacement of the top electrode plate 22 relative to the proof mass 20. The voltage on the top electrode plate 22 is sampled by a first sample and hold device 25. The voltage on the top electrode plate 22 remains on the top electrode plate 22, until a reset pulse discharges the voltage from the top electrode plate 22. A reset pulse will couple the top electrode plate 22 to ground via another switch (not shown) or by coupling the top electrode plate to virtual ground by closing switch S2. The switches S1-S7 can return to open states.

A second charge pulse can then be applied to the bottom electrode plate 24. The control logic device 12 closes switch S3 coupling the proof mass 20 to virtual ground and switch S7 coupling the output of the charge amplifier 16 to the bottom electrode plate 24, while allowing the remaining switches S1, S2, S4, S5 and S6 to remain open. The control logic device may also close another switch (not shown) that couples the top electrode plate 22 to ground, or close switch S1 or S2 coupling the top electrode plate 22 to virtual ground. A charge pulse is applied by the pulse control signal that closes and opens switch S8 coupling the reference voltage VREF to the input of the charge amplifier 16 and providing a charge pulse at the output of the charge amplifier 16 and to the bottom electrode plate 24. The electrode plate voltage ramps up to a positive voltage relative to ground that relates to the displacement of the bottom electrode plate 24 relative to the proof mass 20. The voltage on the bottom electrode plate 24 is sampled by a second sample and hold device 26. The voltage on the bottom electrode plate 24 remains on the bottom electrode plate 24, until a reset pulse discharges the voltage from the bottom electrode plate 24. A reset pulse will couple the bottom electrode plate 24 to ground via another switch (not shown) or by coupling the bottom electrode plate to virtual ground by closing switch S5.

During a charge cycle sequence in the reverse polarity configuration, the control logic device 12 closes switches S1 coupling the proof mass 20 to the top electrode plate 22 and S6 coupling the output of the charge amplifier 16 to the top electrode plate 22 and the proof mass 20. The control logic device 12 couples the bottom electrode plate 24 to virtual ground by closing switch S5, while allowing the remaining switches S2, S4, and S7 to remain open. A charge pulse is applied by the pulse control signal that closes and opens switch S8 coupling the reference voltage VREF to the input of the charge amplifier 16 and providing a charge pulse at the output of the charge amplifier 16 and to the top electrode plate 22 and proof mass 20. The voltage on the top electrode plate 22 and proof mass 20 ramps up to a positive voltage relative to the bottom electrode plate 24 that relates to the displacement of the top electrode plate 22 and proof mass 20 relative to the bottom electrode plate 24. However, the voltage difference between the proof mass 20 relative to the bottom electrode plate 24 is negative reducing the residual charge on the bottom electrode plate 24 due to charge pulses in the normal polarity configuration, such that the net residual charge on the bottom electrode plate 24 is reduced on the average. The voltage on the top electrode plate 22 and proof mass 20 relative to the bottom electrode plate 24 is sampled by the first sample and hold device 25. The voltage on the top electrode plate 22 and the proof mass 20 remains on the top electrode plate 22, until a reset pulse discharges the voltage from the top electrode plate 22 and proof mass 20. A reset pulse will couple the top electrode plate 22 to ground via another switch (not shown) or by coupling the top electrode plate 22 to virtual ground by closing switch S2.

A second charge pulse can then applied to the bottom electrode plate 24 and the proof mass 20. The control logic device 12 closes switch S4 coupling the proof mass 20 to the bottom electrode plate 24 and switch S7 coupling the output of the charge amplifier 16 to the bottom electrode plate 24 and the proof mass 20. The control logic device 12 couples the top electrode plate 22 to virtual ground by closing switch S2, while allowing the remaining switches S1, S5, and S6 to remain open. A charge pulse is applied by the pulse control signal that closes and opens switch S8 coupling the reference voltage VREF to the input of the charge amplifier 16 and providing a charge pulse at the output of the charge amplifier 16 and to the bottom electrode plate 24 and proof mass 20. The voltage on the bottom electrode plate 24 and proof mass voltage ramps up to a positive voltage relative to the top electrode plate 22 that relates to the displacement of the bottom electrode plate 24 and proof mass 20 relative to the top electrode plate. However, the voltage difference between the proof mass 20 relative to the top electrode plate 22 is negative reducing the residual charge on the top electrode plate 22 due to charge pulses in the normal polarity configuration, such that the net residual charge on the top electrode plate 22 is reduced on the average. The voltage on the bottom electrode plate 24 and proof mass 20 relative to the top electrode plate 22 is sampled by the sample and hold device 26. The voltage on the bottom electrode plate 24 and the proof mass 20, until a reset pulse discharges the voltage from the bottom electrode plate 24 and proof mass 20. A reset pulse will couple the bottom electrode plate 24 to ground via another switch (not shown) or by coupling the bottom electrode plate 24 to virtual ground by closing switch S5. The switches S1-S7 can return to open states.

The control logic device 12 generates a first sample and hold control signal (S/H1 CNTRL) for selecting the first sample and hold device 25 and a second sample and hold control signal (S/H2 CNTRL) for selecting the second sample and hold device 26. The sampled voltages on the top and bottom electrode plates 22 and 24 are provided to a differential amplifier 28. The differential amplifier 28 provides a difference signal that represents the difference between the voltage on the top electrode plate 22 and the bottom electrode plate 24. The difference signal is provided to an integrator 30 that integrates a time varying difference signal to generate an integrated difference signal. The integrator 30 is formed from resistors R3, R4, capacitors C3 and C4 and amplifier 30. The integrated difference signal is then provided to an analog to digital converter (A/D) 32, which digitizes the integrated difference signal, and provides the digitized integrated difference signal to the control logic device 12.

The integrated difference signal is employed by the control logic device 12, to adjust the amount of time charge is left on each electrode, or the duty cycle of the charge cycle sequence. The duty cycle of the charge cycle sequence is correlated with the integrated difference signal. The difference in two portions of a single charge cycle sequence or the duty cycle of the charge cycle sequence is a linear measure of acceleration. After a few charge cycle sequences, a valid acceleration value can be determined and provided to an I/O port of the control logic device 12.

It is to be appreciated that the acceleration associated with the accelerometer can vary with time, such that the above process is repeated to provide continuous updates to the acceleration values. For example, if the accelerometer executes from a 10 MegaHertz clock, and the device couple to the I/O is updated at a frequency in the Hertz or kilohertz range, a good average of acceleration readings can be derived by the control logic device 12 for each I/O update, since many charge cycle sequences would have occurred.

Figure 2:
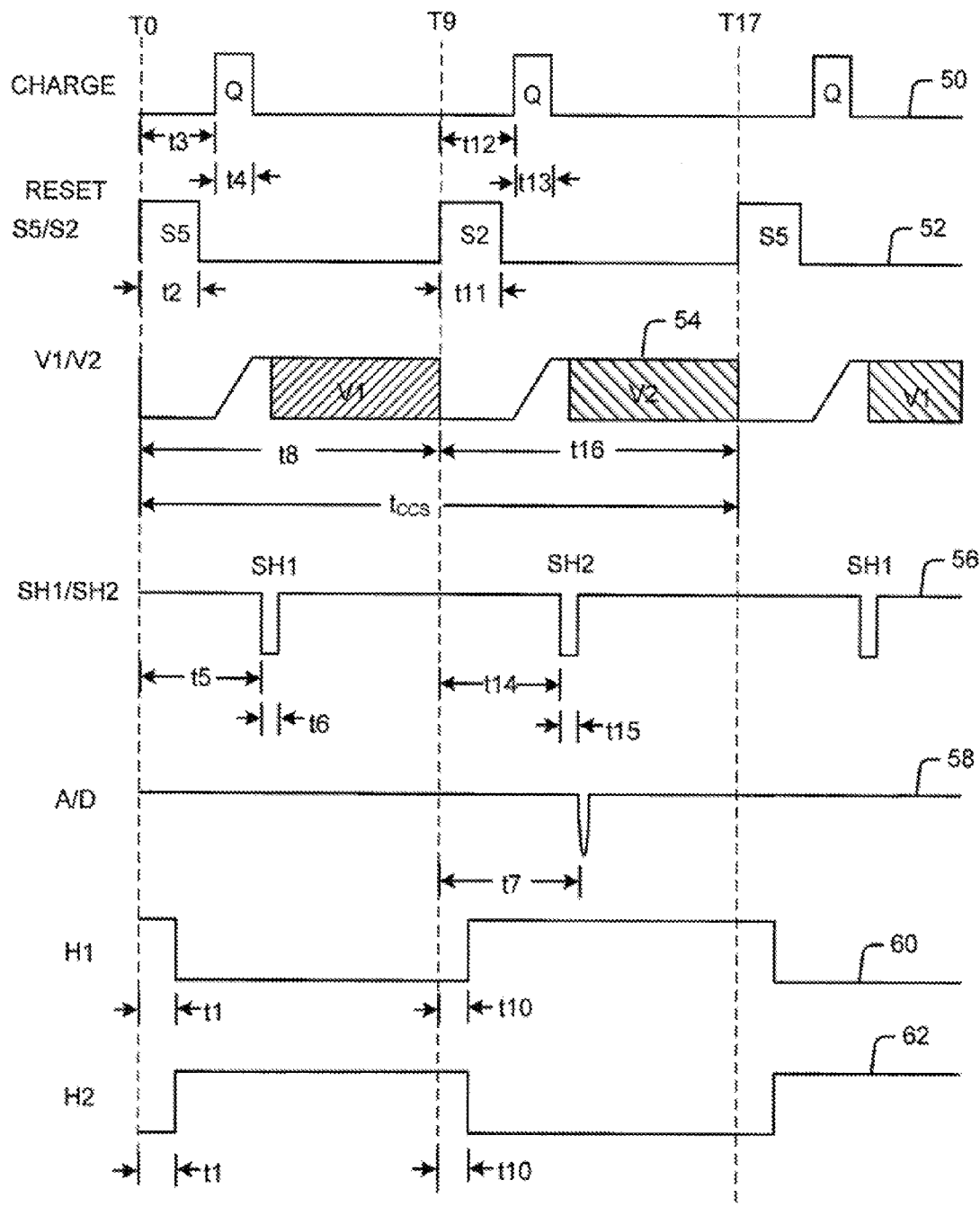
FIG. 2 illustrates a timing diagram associated with applying charge pulses to electrodes of the accelerometer of FIG. 1.

FIG. 2 illustrates a timing diagram associated with applying charge pulses to electrodes of the accelerometer system 10 of FIG. 1. The timing diagram includes a plurality of waveforms including a charge pulse waveform 50 that corresponds to a current pulse provided to an input of the amplifier 16, a reset control signal waveform 52 that corresponds to the reset control signal and a plate voltage waveform 54 that corresponds to the voltage retained at one or the other of the top electrode plate 22 and the bottom electrode plate 24 after application of a charge pulse. The waveforms also include sample and hold control signal waveform 56 that selects between sampling the plate voltage at the first sample and hold device 25 and the second sample and hold device 26. An A/D sample waveform 58 illustrates sampling of the integrated difference signal by the A/D converter 32. Additionally, a first H switch waveform 60 is provided that illustrates a switching state of a first set of switch control signals and a second H switch waveform 62 that illustrates a switching state of a second set of switch control signals. In the normal polarity configuration, the first H switch waveform 60 illustrates the switching state of switch S7 and the second H switch waveform 62 illustrates the switching state of switch S6. In the reverse polarity configuration, the first H switch waveform 60 illustrates the switching state of switches S2, S4 and S7 and the second H switch waveform 62 illustrates the switching state of switch S1, S5 and S6.

In the timing diagram of FIG. 2 an upper case "T" is employed to represent an instance in time, while a lower case "t" is employed to represent a time interval. As illustrated in FIG. 2, at a time T0 a reset control signal is applied to couple the bottom electrode plate 24 to ground or virtual ground as discussed above to discharge any voltage residing on the bottom electrode plate 24 from a previous charge cycle sequence. At an end of a time interval t1 (e.g., 5.38 ms), the first H switch waveform 60 goes low, while the second H switch waveform 62 goes high causing and the bottom electrode plate 24 to be disconnected from the output of the amplifier 16 by the opening of switch S7 and the top electrode plate 22 to be connected to the output of the amplifier 16 by the closing of the switch S6. In the normal polarity configuration, switch S3 remains closed coupling the proof mass 20 to virtual ground, which is the negative input terminal of the charge amplifier 16. In the reverse polarity configuration, switch S4 opens decoupling the bottom electrode plate 24 from the proof mass 20 and switch S5 closes coupling the bottom electrode plate 24 to virtual ground, and switch S1 closes coupling the proof mass 20 to the top electrode plate 22, and switch S2 opens decoupling the top electrode plate 22 from virtual ground.

At an end of a time interval t2 (e.g., 5.38 ms), the reset waveform 52 transitions low disconnecting the selected top electrode plate 22 from ground or virtual ground. At an end of a time interval t3, slightly after the reset waveform 52 transitions low, a charge pulse (Q) is applied to the top electrode plate 22 for a charge pulse period t4 (e.g., 4.89 ms) as illustrated in the charge pulse waveform 50. The charge pulse (Q) is applied by the pulse control signal closing switch S8 coupling the reference voltage VREF to the negative terminal of the operational amplifier 16 via the switching system 14. This results in a charge pulse at the output of the amplifier 16 and at the top electrode plate 22 in the normal polarity configuration and the top electrode plate 22 and proof mass 20 if operating in the reverse polarity configuration.

As illustrated in the plate voltage waveform 54, the plate voltage on the top electrode plate 22 ramps up to a voltage level V1 that is associated with the displacement of the proof mass 20 relative to the top electrode plate 22 in the normal polarity configuration and the displacement of the bottom electrode plate 24 from the top electrode plate 22 and proof mass 20 in the reverse polarity configuration. At an end of a time interval t5 just after the plate voltage ramps to voltage level V1, the first sample and hold circuit 25 samples the voltage on the top electrode plate 22 for a sample time interval t6, as illustrated in sample and hold control signal waveform 56. The plate voltage remains on the top electrode plate 22, until an end of a time interval t8. The time interval t8 represents a first portion of a time interval $t_{CCS}$ of a charge cycle sequence. A constant electrostatic force is applied to the proof mass 20 in both the normal and reverse polarity configurations during the time the voltage V1 remains on the top electrode plate 22.

At time T9, a reset signal is applied causing the top electrode plate 22 to discharge voltage V1 residing on the top electrode plate 22 from the first portion of the charge cycle sequence. At an end of a time interval t10 from time T9, the second H switch waveform 62 goes low, while the first H switch waveform 60 goes high causing the top electrode plate 22 to be disconnected from the output of the amplifier 16 and the bottom electrode plate 24 to be connected to the output of the amplifier 16. In the normal polarity configuration, switch S3 remains closed coupling the proof mass 20 to virtual ground, which is a negative input terminal of the charge amplifier 16. In the reverse polarity configuration, switch S1 opens decoupling the top electrode plate 22 from the proof mass 20 and S2 closes coupling the top electrode plate 22 to a virtual ground, and switch S4 closes coupling the proof mass 20 to the bottom electrode plate 24, and switch S5 opens decoupling the bottom electrode plate 24 from virtual ground.

At an end of a time interval t11 from T9, the reset waveform 52 transitions low disconnecting ground or virtual ground from the selected bottom electrode plate 24. At an end of a time interval t12 from time T9, slightly after the reset waveform 52 transitions low, a charge pulse (Q) is applied to the bottom electrode plate 24 for a charge pulse period t13 (e.g., 4.89 ms), as illustrated in the charge pulse waveform 50. The charge pulse (Q) is applied by the pulse control signal and polarity select signal coupling the reference voltage VREF to the negative terminal of the operational amplifier 16. This results in a charge pulse at the input of the amplifier 16 and at the bottom electrode plate 24.

As illustrated in the plate voltage waveform 54, the plate voltage of the bottom electrode plate 24 ramps up to a positive voltage level V2 that is associated with the displacement of the proof mass 20 relative to the bottom electrode plate 24 in the normal polarity configuration and the displacement of the top electrode plate 22 from the bottom electrode plate 24 and proof mass 20 in the reverse polarity configuration. At an end of a time interval t14 from time T9, just after the plate voltage ramps to voltage level V2, the second sample and hold circuit 26 samples the voltage on the bottom electrode plate 24 for a sample time interval t15, as illustrated in sample and hold control signal waveform 56.

At an end of a time interval t7 from time T9, slightly after an end of the sample time interval T15, the A/D converter 32 samples a difference signal provided by the integrator 30, as illustrated in the A/D sample waveform 58. The integrator 30 receives the difference signal from the differential amplifier 28 that provides a difference voltage of the top electrode plate voltage V1 of the first sample and hold device 25 and the bottom electrode plate voltage V1 from the second sample and hold device 26. The plate voltage V2 remains on the bottom electrode plate 24, until an end of a time interval t16 from time T9. The time interval t16 represents a second portion of the time interval $t_{CCS}$ of the charge cycle sequence. A constant electrostatic force is applied to the proof mass 20 in both the normal and reverse polarity configurations during the time the voltage V2 remains on the bottom electrode plate 24, until a time T17 in which the next reset pulse is applied to the bottom electrode 24. The time interval $t_{CCS}$ of the charge cycle sequence remains constant, while the time interval t8 and t16 vary based on the forces required to null the proof mass 20 between the top and bottom electrodes 22 and 24. The ratio of the time interval t8 of the first portion of the charge cycle sequence to the time interval $t_{CCS}$ of the charge cycle sequence (i.e., sum of the time interval t8 and t16) represents the duty cycle of the charge cycle sequence. The duty cycle of the charge cycle sequence can be employed to derive the acceleration experienced by the proof mass 20.

Figure 3:
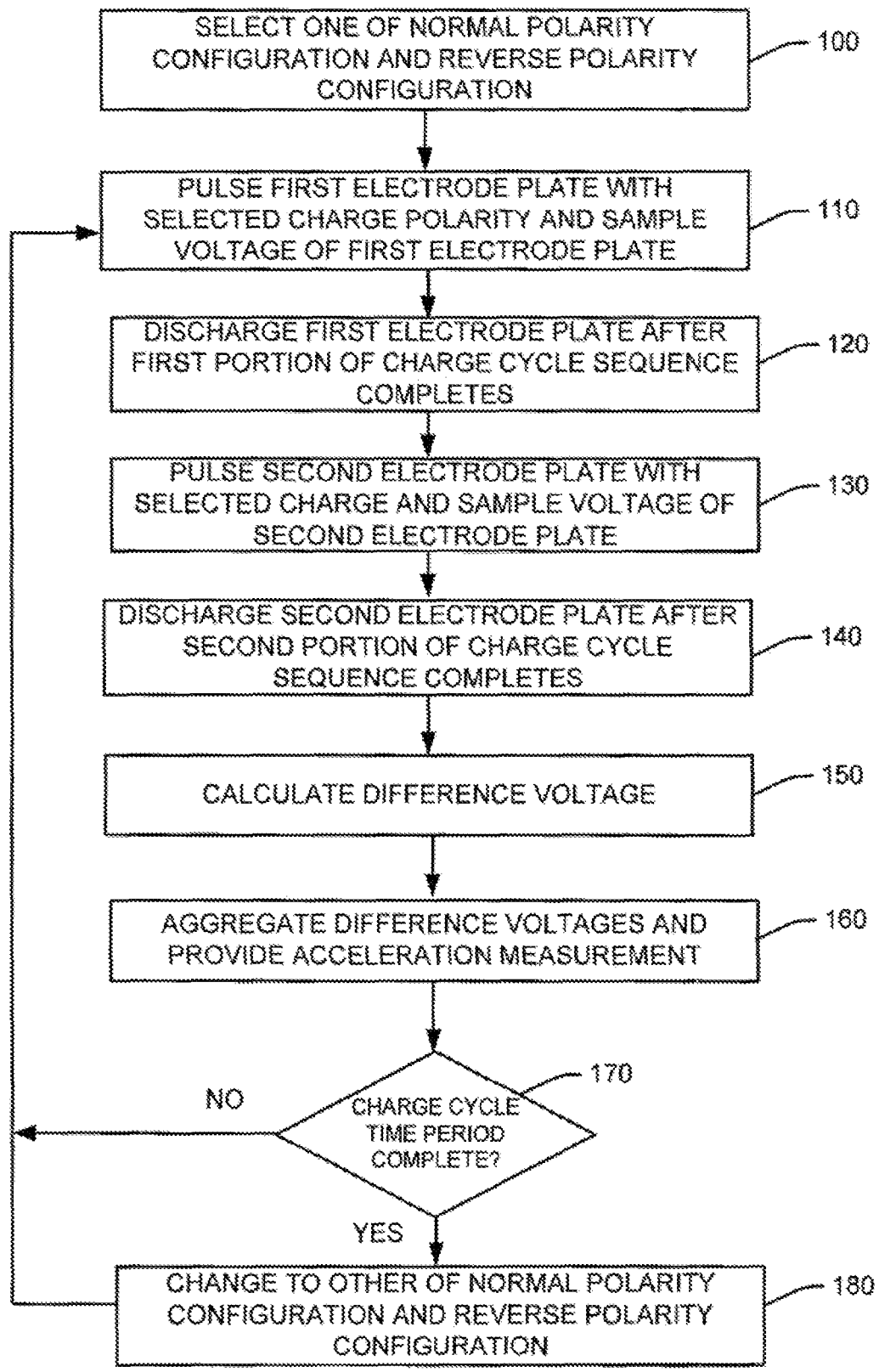
FIG. 3 illustrates a methodology for mitigating error in force balanced instruments in accordance with an aspect of the present invention.

In view of the foregoing structural and functional features described above, methodology in accordance with various aspects of the present invention will be better appreciated with reference to FIG. 3. While, for purposes of simplicity of explanation, the methodology of FIG. 3 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 3 illustrates a methodology for mitigating errors in a force balanced instrument, such as an accelerometer. The force balanced instrument includes a sensing element that includes a proof mass disposed between opposing first and second electrode plates. The methodology begins at 100 where one of a normal polarity configuration and reverse polarity configuration is selected. In the normal polarity configuration, the proof mass is coupled to virtual ground and the selected plate of the first and second electrode plates alternately receive a charge pulse. In the reverse polar mode, the proof mass is coupled to a non-selected plate of the first and second electrode plates and the selected plate of the first and second electrode plates is coupled to virtual ground, while the non-selected plate of the first and second electrode plates and coupled proof mass alternately receive a charge pulse. Switching operation between the normal polarity configuration and reverse polarity configuration results in the removal of any residual charge on the electrodes caused by the charge pulses in the normal polarity configuration. As a result the net residual charge left on the electrodes is reduced on the average.

At 110, a first electrode plate (e.g., a top electrode) is pulsed with the selected charge polarity and the voltage of the first electrode plate is sampled slightly after the first electrode plate has achieved a voltage level associated with the displacement of the first electrode plate relative to a proof mass in the normal polarity configuration, or associated with displacement of the second electrode plate to the proof mass and first electrode plate in the reverse polarity configuration. At 120, the first electrode plate is discharged after a first portion of charge cycle sequence completes. The methodology then proceeds to 130.

At 130, a second electrode plate (e.g., a bottom electrode) is pulsed with the selected charge polarity and the voltage of the second electrode plate is sampled slightly after the second electrode plate has achieved a voltage level associated with the displacement of the second electrode plate relative to the proof mass in the normal polarity configuration, or associated with displacement of the first electrode plate to the proof mass and second electrode plate in the reverse polarity configuration. At 140, the second electrode plate is discharged after a second portion of the charge cycle sequence completes. The methodology then proceeds to 150. At 150, a difference voltage of the first and second electrode plates is calculated that provides an indication of the displacement of the proof mass relative to the first and second electrode plates. The methodology then proceeds to 160 to aggregate the calculated difference voltage over time to set a duty cycle that provides a good indication of the acceleration experienced by the proof mass. The aggregated difference voltage is employed to adjust the duly cycle of the charge cycle sequence to determine the time intervals of the first and second portions of the charge cycle sequence. This provides an indication of the force necessary to null the proof mass and can be employed to determine acceleration of the proof mass. The methodology then proceeds to 170.

At 170, the methodology determines if the charge cycle time period has completed. For example, a charge cycle time period can be a single charge cycle sequence. Alternatively, a charge cycle time period can include a plurality of charge cycle sequences. If the charge cycle time period has not completed (NO), the methodology returns to 110 to continue providing charge pulses of the selected polarity to the first and second electrodes. If the charge cycle time period has completed (YES), the methodology proceeds to 180. At 180, the selected sensing element configuration is changed to the other of normal polarity configuration and reverse polarity configuration. The methodology then returns to 110 to provide charge pulses with the changed polarity configuration, until the next charge cycle time period completes.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A force balanced instrument system comprising:
    a sensing element having an inertial proof mass disposed between a first electrode plate and a second electrode plate;
    a switching system switchable between providing charge pulses to the sensing element in a normal polarity configuration and providing the charge pulses to the sensing element in a reverse polarity configuration; and
    a control logic device that controls the switching of the switching system to provide the charge pulses to the sensing element in the normal polarity configuration for a first charge cycle time period and to provide the charge pulses to the sensing element in the reverse polarity configuration for a second charge cycle time period.

2. The system of claim 1, further comprising a single reference voltage that provides the charge pulses to the sensing element in both the normal polarity configuration and reverse polarity configuration.

3. The system of claim 1, wherein the control logic device in the reverse polarity configuration configures the switching system to alternately couple a selected plate of the first and second electrode plates to one of ground and virtual ground, alternately couple a non-selected plate of the first and second electrode plates to the proof mass, and alternately provide the charge pulses to the non-selected plate and the coupled proof mass.

4. The system of claim 3, wherein the control logic device in the normal polarity configuration configures the switching system to alternately couple a non-selected plate of the first and second electrode plates to one of ground and virtual ground, to couple the proof mass to one of ground and virtual ground and to alternately couple a selected plate of the first and second electrode plates to receive a charge pulse.

5. The system of claim 1, further comprising an operational amplifier that receives a charge pulse from a first portion of the switching system and provides the charge pulse to a second portion of the switching system that selects between providing the charge pulse to one of the first electrode plate and the second electrode plate.

6. The system of claim 1, wherein the first electrode plate charges to a voltage indicative of the displacement of the first electrode plate to the proof mass in response to a charge pulse and the second electrode plate charges to a voltage indicative of the displacement of the proof mass to the second electrode plate in response to a charge pulse in the normal polarity configuration, and the first electrode plate charges to a voltage indicative of the displacement of the second electrode plate to the proof mass and the second electrode plate charges to a voltage indicative of the displacement of the proof mass to the first electrode plate in response to a charge pulse in the reverse polarity configuration.

7. The system of claim 1, further comprising:
    a first sample and hold device;
    a second sample and hold device;
    a difference amplifier that provides a difference voltage based on a first voltage sampled by the first sample and hold device and a second voltage sampled by the second sample and hold device; and
    wherein the first sample and hold device samples the voltage on the first electrode plate and the second sample and hold device samples the voltage on the second electrode plate during application of the charge pulses.

8. The system of claim 1, the normal polarity configuration providing the charge pulses alternately to the first and second electrode plates and the reverse polarity configuration providing the charge pulses alternately to the first electrode plate and to the proof mass coupled to the first electrode plate and to the second electrode plate and to the proof mass coupled to the second electrode plate.

9. A force balanced instrument having a sensing element having an inertial proof mass disposed between a first electrode plate and a second electrode plate, the instrument comprising:
    means for providing charge pulses;
    means for switching between applying the charge pulses to the sensing element in a normal polarity configuration and applying the charge pulses to the sensing element in a reverse polarity configuration; and
    means for controlling a charge cycle time period for applying the charge pulses to the sensing element in the normal polarity configuration and controlling a charge cycle time period for applying the charge pulses to the sensing element in the reverse polarity configuration.

10. The instrument of claim 9, further comprising:
    a first means for sampling a first voltage on the first electrode plate of the sensing element induced by a charge pulse;
    a second means for sampling a second voltage on the second electrode plate of the sensing element induced by a charge pulse;
    means for generating a difference voltage associated with the difference between the first voltage and the second voltage; and
    means for controlling an amount of time a charge is retained on the first electrode plate and the amount of time a charge is retained on the second electrode plate based on the difference voltage.

11. The instrument of claim 9, wherein the means for controlling in the reverse polarity configuration configures the means for switching to alternately couple a selected plate of the first and second electrode plates to one of ground and virtual ground, to alternately couple a non-selected plate of the first and second plates to the proof mass, and alternately provide the charge pulses to the non-selected plate and the coupled proof mass.

12. The instrument of claim 9, wherein the means for controlling in the normal polarity configuration configures the means for switching to alternately couple a non-selected plate of the first and second electrode plates to one of ground and virtual ground, to couple the proof mass to one of ground and virtual ground and to alternately couple a selected plate of the first and second electrode plates to receive a charge pulse.

13. The instrument of claim 9, wherein the means for controlling configures the means for switching to alternate between applying a charge pulse to the first and second electrode plates in the normal polarity configuration and alternate between applying a charge pulse to the first electrode plate and to the proof mass coupled to the first electrode plate and applying a charge pulse to the second electrode plate and to the proof mass coupled to the second electrode plate in the reverse polarity configuration.

14. The instrument of claim 13, wherein the first electrode plate charges to a voltage indicative of the displacement of the first electrode plate to the proof mass in response to a charge pulse and the second electrode plate charges to a voltage indicative of the displacement of the proof mass to the second electrode plate in response to a charge pulse in the normal polarity configuration, and the first electrode plate charges to a voltage indicative of the displacement of the second electrode plate to the proof mass and the second electrode plate charges to a voltage indicative of the displacement of the proof mass to the first electrode plate in response to a charge pulse in the reverse polarity configuration.

15. The instrument of claim 9, wherein the means for providing the charge pulses comprises a single reference voltage that provides the charge pulses to the sensing element in both the normal polarity configuration and the reverse polarity configuration.

16. A method for mitigating error in a force balanced instrument that employs a sensing element having an inertial proof mass disposed between a first electrode plate and a second electrode plate, the method comprising:

switching the sensing element to one of a normal polarity configuration and a reverse polarity configuration;

applying a charge pulse from a reference voltage alternately to the first electrode plate and the second electrode plate for a first charge cycle time period;

determining a first difference voltage between voltages induced by charge pulses from the reference voltage on the first electrode plate and the second electrode plate for each charge cycle sequence of the first charge cycle time period;

aggregating the first difference voltage over time to set a duty cycle associated with the charge cycle sequence of the first charge cycle time period;

switching to the other of the normal polarity configuration and the reverse polarity configuration;

applying a charge pulse from the reference voltage alternately to the first electrode plate and the second electrode plate for a second charge cycle time period;

determining a second difference voltage between voltages induced by the charge pulses from the reference voltage on the first electrode plate and the second electrode plate for each charge cycle sequence of the second charge cycle time period; and aggregating the second difference voltage over time to set a duty cycle associated with the charge cycle sequence of the second charge cycle time period.

17. The method of claim 16, wherein the switching the sensing element to the reverse polarity configuration comprises alternately coupling a selected plate of the first and second electrode plates to one of ground and virtual ground and alternately coupling a non-selected plate of the first and second plates to the proof mass, such that the charge pulses are applied to the non-selected plate and the coupled proof mass.

18. The method of claim 16, wherein the switching the sensing element to the normal polarity configuration comprises alternately coupling a non-selected plate of the first and second electrode plates to one of ground and virtual ground, such that the charge pulses are applied to a selected plate of the first and second electrode plates.

19. The method of claim 16, wherein the first electrode plate charges to a voltage indicative of the displacement of the first electrode plate to the proof mass in response to a charge pulse and the second electrode plate charges to a voltage indicative of the displacement of the proof mass to the second electrode plate in response to a charge pulse in the normal polarity configuration, and the first electrode plate charges to a voltage indicative of the displacement of the second electrode plate to the proof mass and the second electrode plate charges to a voltage indicative of the displacement of the proof mass to the first electrode plate in response to a charge pulse in the reverse polarity configuration.

* * * * *